United States Patent
Kamradt et al.

(10) Patent No.: US 9,815,684 B2
(45) Date of Patent: Nov. 14, 2017

(54) FUELING STATION FOR UNMANNED AERIAL VEHICLE OF THE VERTICAL TAKEOFF TYPES

(71) Applicants: Brian Kamradt, Indianapolis, IN (US); Dart A. Fox, Indianapolis, IN (US)

(72) Inventors: Brian Kamradt, Indianapolis, IN (US); Dart A. Fox, Indianapolis, IN (US)

( * ) Notice: Subject to any disclaimer, the term of this patent is extended or adjusted under 35 U.S.C. 154(b) by 567 days.

(21) Appl. No.: 13/998,443

(22) Filed: Nov. 1, 2013

(65) Prior Publication Data

US 2015/0123462 A1 May 7, 2015

(51) Int. Cl.
| | | |
|---|---|---|
| *B60L 1/00* | (2006.01) | |
| *B60L 3/00* | (2006.01) | |
| *H02G 3/00* | (2006.01) | |
| *B67D 7/84* | (2010.01) | |
| *B67D 7/02* | (2010.01) | |
| *B67D 7/04* | (2010.01) | |
| *B67D 7/78* | (2010.01) | |
| *B64C 39/02* | (2006.01) | |

(52) U.S. Cl.
CPC ............ *B67D 7/845* (2013.01); *B64C 39/024* (2013.01); *B67D 7/02* (2013.01); *B67D 7/0401* (2013.01); *B67D 7/78* (2013.01); *B64C 2201/024* (2013.01); *B64C 2201/063* (2013.01); *B64C 2201/128* (2013.01); *B64C 2201/141* (2013.01); *B64C 2201/182* (2013.01); *B67D 2210/00089* (2013.01)

(58) Field of Classification Search
CPC .......... B64C 39/024; B67D 7/02; B65G 67/00
See application file for complete search history.

(56) References Cited

U.S. PATENT DOCUMENTS

| | | | | |
|---|---|---|---|---|
| 8,899,903 B1* | 12/2014 | Saad | ...................... | B65G 67/00 320/109 |
| 2006/0260387 A1* | 11/2006 | Baillargeon | ......... | B67D 7/3209 73/40.5 R |
| 2008/0277524 A1* | 11/2008 | Brock | ................... | B64C 39/024 244/36 |
| 2012/0210853 A1* | 8/2012 | Abershitz | ................. | B64F 1/04 89/1.11 |
| 2014/0032034 A1* | 1/2014 | Raptopoulos | ........ | G08G 5/0069 701/25 |

(Continued)

*Primary Examiner* — Rexford Barnie
*Assistant Examiner* — Rasem Mourad

(57) ABSTRACT

An unmanned self-sustained fuel dispensing station for fuels of all sorts (gasoline, pesticides, water, fertilizers etc.) a tank, docking, and coupling system for unmanned aerial vehicles (UAV) of the vertical takeoff types. The station can be independent of public power and communication utilities and can operate by remote control without an on-site attendant. The preferred system has a central command center with a control computer in communication with a station control computer located at one or more satellite stations through a communications link. The station control computer can be controlled remotely by the command center. The station control computer programming has control over the activities of the station through an electrical generation subsystem with a solar array, battery bank, battery charger and standby generator; a fuel dispensing subsystem; a security subsystem with video cameras; a communications link and a status sensor subsystem.

7 Claims, 2 Drawing Sheets

(56) References Cited

U.S. PATENT DOCUMENTS

2014/0116234 A1* 5/2014 Jacq .................. F41A 23/20
                                                                89/1.11
2014/0324217 A1* 10/2014 Barker ............... B67D 7/222
                                                                700/244

* cited by examiner

FUELING STATION FOR UNMANNED AERIAL VEHICLE OF THE VERTICAL TAKEOFF TYPES

TECHNICAL FIELD

The present invention relates generally to an unmanned self-sustained fuel dispensing station for fuels of all sorts (gasoline, pesticides, water, fertilizers etc.) a tank, docking, and coupling system for (UAV) of the vertical takeoff types and systems and methods that incorporate controller input and sensor input when coupling (UAV) to refueling station.

BACKGROUND OF THE INVENTION (UAV) of the vertical takeoff types are typically fueled by an attendant using a hand held fuel dispensing tank. The attendant dispenses the fuel by manually inserting the nozzle of the fuel tank into the matched opening in the fuel tank of the (UAV) of the vertical takeoff types. This method of refueling is not a controlled processes and requires man power, is time consuming and is an uneconomical approach to refueling.

Accordingly, there is a need for an unmanned self-sustained fuel dispensing station for fuels of all sorts (gasoline, pesticides, water, fertilizers etc.) a tank, docking, and coupling system for (UAV) that offer a controlled process and economical approach to refueling. The present invention satisfies these needs as well as others and is an improvement over present methods.

SUMMARY OF THE INVENTION

By way of example and not of limitation, the present invention generally comprises an independent fueling system that is designed to operate off-grid (without connection to electrical utilities) in remote locations. It is designed to be an unmanned self-sustained fuel dispensing station for the fueling of (UAV). The preferred major components include one or more fuel tanks, fuel piping, a tank, docking, and coupling system, fuel dispensers, a landing platform, LED lighting, electrical controls, battery backup system, generator system and GPS guidance system. It can operate in a stand-alone mode without any connection to an electric utility system, or it can be grid connected where available. The primary energy source is preferably a renewable energy source such as windmills, steam, or solar panels or fuel cells etc. or any combination of renewable sources. Any excess energy from the primary source is used to charge a battery bank. The secondary source is the generator, and/or grid supplied electricity if it is readily available.

The preferred modular system has a central control center with a central control computer that is connected to one or more station control subsystem computers in remote satellite stations through a communications link. The station control computer has programming that controls a number of station subsystems. One embodiment has an electricity generation subsystem with a solar array, a battery bank, a battery charger and a standby generator; a fuel dispensing subsystem with at least one fuel storage tank and at least one fuel dispenser with a tank mounted pump, pump controller, hose and nozzle connected to the fuel storage tank, GPS guidance system, a security subsystem that may include digital cameras, remote monitoring sensors, a status sensor subsystem with fuel level sensors, electricity production sensors and monitoring and can be automatically monitored and operated by the central control center computer through the communications link.

The heart of the system is a tank, docking, coupling and control system that allows fueling automatically without human intervention. This allows the system to be operated as an unmanned self-sustained fuel dispensing station. The control system allows the monitoring, locating, guiding and coupling of the (UAV) based on a specific logic programming provided by the stations control computer.

It is another aspect and advantage of the present invention to provide a unmanned self-sustained fuel dispensing station with a subsystem of tanks of all sizes that can be fitted to (UAV) of all sizes and has a coupling and docking system designed to couple to the preferred system.

The primary power source that is preferred is solar. Solar panels mounted onto the structure. These panels can provide adequate power to operate the full facility during day light hours when the sun is shining, and charge the batteries for night time operation. The components are sized such that the backup generator system or grid supplied power would not be used during consecutive sunny days. The secondary energy sources would only become necessary when there are consecutive days without sunshine or in an emergency where there is a large demand or a system malfunction.

In one embodiment, the unmanned self-sustained fuel dispensing station is wirelessly connected to a central control center that can receive information from the station including live video feeds from security cameras, sensor data from storage tanks, sensor data from docking and coupling system, GPS data, energy usage and production information etc.

Operators at the central control center can act as remote attendants with the capability of remotely monitoring and operating all systems.

In another embodiment, several remote stations are connected to a central control center via direct wireless communications; Internet based communications or wired communications where available.

According to one aspect of the invention, an unmanned self-sustained fuel dispensing station and system are provided that can be installed in remote locations where there is no access to electrical power from a public utility or access to wired telephone or Internet services.

It is another aspect and advantage of the present invention to provide a fueling station that does not require the presence of an on-site attendant and that can be operated by remote control.

According to another aspect of the invention, an unmanned self-sustained fuel dispensing station and system are provided that have security measures to protect the station components from extreme weather and vandalism.

It is still another aspect of the present invention to provide an unmanned self-sustained fuel dispensing station that is energy self-sufficient with a combination of a renewable energy source such as solar and an auxiliary generator and battery storage.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

By way of example and not of limitation, the apparatus and system of the present invention generally comprises one or more independent self-contained fueling stations that can be placed in remote locations without an on-site attendant or connections with wired telephone or electrical utility power sources. The station control components are preferably in communication with a central control center through a wireless link that permits remote monitoring and operating of all the station systems and sub systems from the central control center 20.

Figure 1:
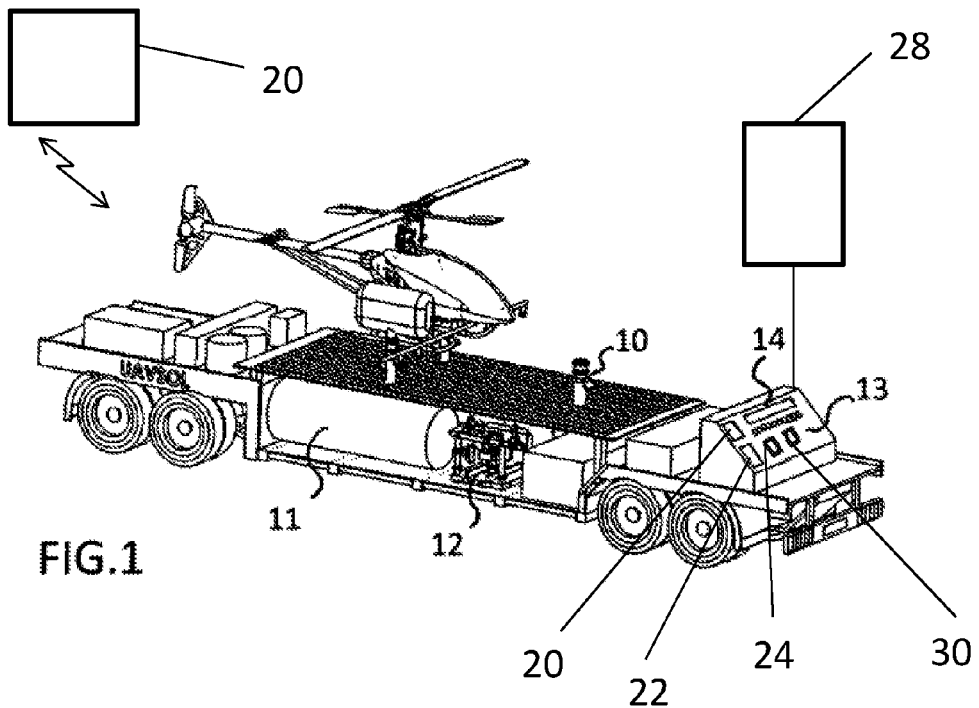
FIG. 1 is a perspective view of the unmanned self-sustained fuel dispensing station embodiment of the invention.
Figure 2:
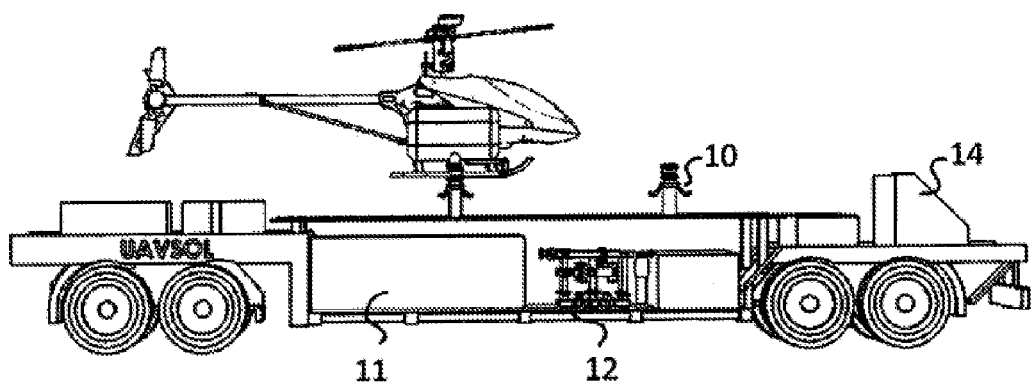
FIG. 2 is a side view of the unmanned self-sustained fuel dispensing station embodiment shown in FIG. 1 according to the invention.
Figure 4:
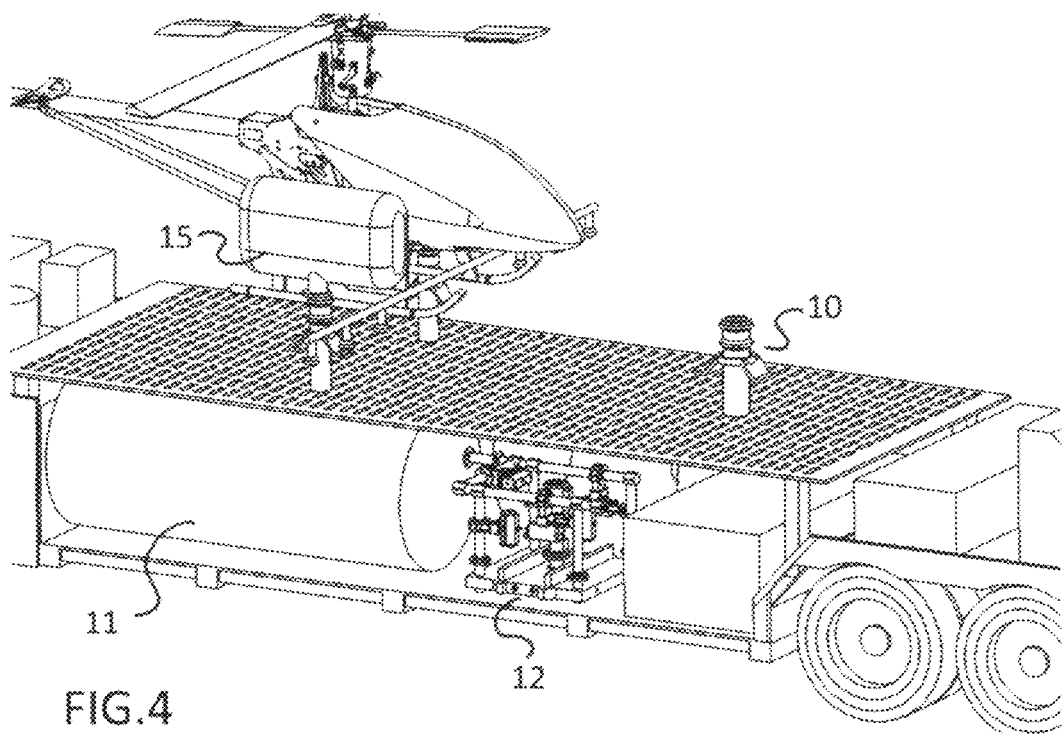
FIG. 4 is a cut out view of the unmanned self-sustained fuel dispensing station embodiment of the invention showing the tank, piping, docking, and coupling system.

Turning now to FIG. 1 and FIG. 4, one embodiment of the invention, the dispensing docking and coupling system 10 is schematically shown. The station shown is configured with on board fuel tanks 11 for fuels of all sorts (gasoline, pesticides, water, fertilizers etc. In another embodiment, multiple tanks or multiple tanks with compartments may be used for fuel storage.

The tanks 11 have filling portals. Fuel is transported to the station location by tanker truck and deposited through the filling portals.

The tanks 11 preferably have fuel level sensors 22 that continually monitor the level of the fuel in the tank. These monitoring sensors will also verify the amount of fuel delivered to the station by the fuel delivery truck and deposited in the tank as well as the remaining fuel available. Other fuel sensors continuously monitor secondary spaces around the storage tanks, inside sumps, and the secondary space of double wall piping to detect any breaches of the primary containment. The station can normally run without human intervention from several weeks to several months depending on the size and number of storage tanks.

FIG. 4, another embodiment of the invention, the subsystem of tanks of all sizes that can be fitted to (UAV) of all sizes and has a coupling and docking system designed to couple to the preferred system 15 is schematically shown.

Although only several storage tanks 11 are shown, it will be understood that a plurality of storage tanks can be used. In addition, storage tanks can also be used to store fuels of all sorts. The storage tanks 11 are connected to one or more dispenser docking and coupling systems. In the embodiment shown in FIG. 1 and FIG. 4, the dispenser docking and coupling system 10 are connected with a fuel piping and pumping system 12 to the fuel tank 11.

The dispenser docking and coupling systems 10 can be disabled with a signal from a security system in case of dispenser damage or malfunction or with a loss of electrical power when station sensors indicate damage.

The station control center is an on-board computer 13 with programming and storage that is connected to the station sensors, security system, communications system, dispensing systems, energy production and storage system, and station status monitoring and control systems. In one embodiment, the station control center has a second redundant computer as a backup in case of failure by the primary station control computer.

The station control center on-board computer 13 is preferably connected through the communications link to a central command center at a remote location so that the sensors, a security subsystem 24 with digital cameras and a remote monitoring system, power functions, the station on-board control computer 13 and other operations can be controlled remotely from the central command center. The central command center may exert control over the station control center 13 and station components with a supervisory human attendant or with a command computer that has programming that responds to selected conditions at the station and also monitors and records sensor and status data from the station on-board control computer 13.

The preferred system has a central command center with a central control computer in communication with a station on-board control computer 13 at one or more satellite locations through a wireless communications link. The station on-board control computer 13 has control over the activities of the station and its sub systems. The station on-board control computer 13 and the various subsystems can be controlled remotely by the command center.

The station control center housing 14 may have an optional heating or cooling system to control the environmental conditions of the station on-board computer, sensors, e.g. temperature sensors 26, or other components with the housing to protect them from large variations in temperature. Temperature extremes may cause malfunctions or shorten the lifespan of sensitive electronic components.

In one embodiment, the station on-board control computer automatically generates reports regarding sensor data, fuel dispenser status, fuel level status, electrical system status and other desired statistics or data and sends them through the communications link to the command center for evaluation. Diagnostic tests and computer programming and troubleshooting can also be performed remotely from the central command center. Transmissions of the data to the command center may be dynamic or scheduled. Evaluation of the transmitted station data may be conducted by a remote monitoring attendant or by the programming of a command center computer that can generate an alarm if conditions exceed predefined limits.

The station control center 13 on-board computer can also generate and transmit an alarm to the command center when a malfunction in one of the sub systems, or an act of vandalism or extreme weather conditions and the like are detected. Alarms may identify circumstances that require the attention of a maintenance worker to travel to the station to replace, repair or troubleshoot a component. A remote attendant can also exert remote control over the station in response to an alarm.

The station is preferably powered by a power source 28, e.g. a solar energy source and a battery bank that is part of an energy production and storage subsystem. The preferred primary source of electrical power is a renewable energy source in the form of an array of solar cells. The electrical power that is produced is used primarily to power the pumps and other station energy needs. Excess power from the solar array or other power source is used to charge the batteries of the battery bank. At night or where power consumption exceeds production by the solar array, a generator can be actuated to recharge the battery bank or to provide electricity directly for station pumps and other systems. The generator can be fueled by liquid fuel or gas fuel. The generator may have its own fuel supply or may be connected to any of the on-board fuel tanks 11 so that the generator has access to a large fuel reserve. The generator may also be fueled by propane or other flammable gas kept in storage tanks on the station.

In the embodiment shown in FIG. 1,2,3,4, the supply of electricity for the station is independent of the power grid so that the station is electrically self-sustaining supported by renewable energy, battery storage and fueled auxiliary electricity generation. The renewable energy source provides power to the station and the battery storage supplements any electrical demand in excess of production.

The electrical demand for the docking, coupling, fueling, station status and sensor, communication, security and control systems is provided from three different prioritized sources: solar, battery and auxiliary generator.

Alternatively, if the charge capacity of the battery bank drops and the solar production is low, the electricity can be provided by an electrical utility where power from a utility is available. The external power from the utility is used to charge the battery bank and to supply the station power demand until the battery bank is fully charged or the power from the solar cells becomes available.

From the discussion above it will be appreciated that the invention can be embodied in various ways, including the following:

The preferred system as a motorized vehicle.

Figure 3:
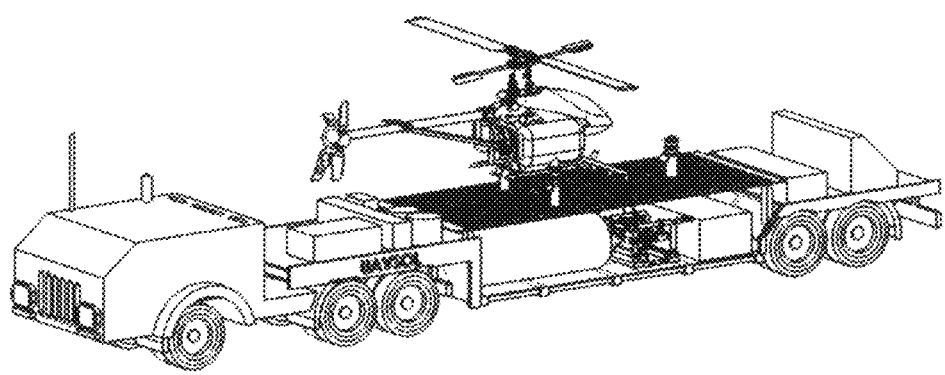
FIG. 3 is a perspective view of the unmanned self-sustained fuel dispensing station embodiment of the invention as a self-propelled unmanned remote controlled motorized vehicle.

The preferred system as shown in FIG. 3, a self-propelled unmanned motorized vehicle that can be operate by remote control with an auto-steering guidance systems 30 through a communications link to the command center or satellite station.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation (s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function. The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation (s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 1 12, sixth paragraph, unless the element is expressly recited using the phrase "means for."

What is claimed is:

1. An unmanned self-sustained fuel dispensing station for different fuels for a plurality of unmanned aerial vehicles (UAVs) comprising:
   a plurality of fuel storage tanks of different sizes, each fuel storage tank of the plurality of fuel storage tanks holding a different fuel to be dispensed to at least one of the UAVs of the plurality of UAVs,
   a landing platform for landing the UAV,
   a docking and coupling system,
   a pump adapted to deliver fuel,
   a piping system fluidly connected to the pump to transmit fuel from at least one fuel storage tank,
   at least one fuel coupling and dispensing system connected to the piping system, wherein the plurality of fuel storage tanks of different sizes, the pump, the piping system, and the coupling system form a subsystem configured to be fitted to different sized UAVs of the plurality of UAVs,
   a communications link operable to communicate with a control computer at a central command center remote to the station, the control computer having a remote control to remotely operate the station through the communications link, an auto-steering guidance system to operate the station, and a station control on-board computer operably coupled to the communications link and a controller for the pump, the computer being configured to permit the control computer to remotely monitor and operate the station, wherein the station is a self-propelled unmanned motorized vehicle operable with the auto-steering guidance system and the remote control.

2. The unmanned self-sustained fuel dispensing station of claim 1 further comprising wheels.

3. The unmanned self-sustained fuel dispensing station of claim 1, wherein the station is anchored to a foundation.

4. The unmanned self-sustained fuel dispensing station of claim 1 further comprising a temperature sensor to monitor a temperature of the station control on-board computer.

5. The unmanned self-sustained fuel dispensing station of claim 1 further comprising at least one of a solar array, battery bank, battery charger or standby generator to power the station control on-board computer.

6. The unmanned self-sustained fuel dispensing station of claim 1 further comprising a security subsystem with video cameras and motion sensors.

7. The unmanned self-sustained fuel dispensing station of claim 1, wherein the at least one fuel storage tank comprises a fuel level sensor.

* * * * *